United States Patent [19]

Takekoshi

[11] 4,281,100

[45] Jul. 28, 1981

[54] INJECTION MOLDABLE POLYETHERIMIDE OLIGOMERS AND METHOD FOR MAKING

[75] Inventor: Tohru Takekoshi, Scotia, N.Y.

[73] Assignee: General Electric Company, Schenectady, N.Y.

[21] Appl. No.: 160,463

[22] Filed: Jun. 18, 1980

Related U.S. Application Data

[63] Continuation of Ser. No. 37,438, May 9, 1979, abandoned.

[51] Int. Cl.³ ............... C08G 69/28; C08G 69/32; C08G 73/10; C08G 73/14
[52] U.S. Cl. ........................ 528/188; 528/26; 528/125; 528/126; 528/128; 528/172; 528/185; 528/207; 528/208
[58] Field of Search ............ 528/125, 126, 128, 185, 528/208, 26, 172, 179, 188, 207

[56] References Cited

U.S. PATENT DOCUMENTS

| | | | |
|---|---|---|---|
| 3,847,867 | 11/1974 | Heath et al. | 528/125 |
| 3,905,942 | 9/1975 | Takekoshi et al. | 528/125 |
| 3,983,093 | 9/1976 | Williams et al. | 528/185 |
| 3,989,670 | 11/1976 | Takekoshi et al. | 528/208 |
| 4,048,142 | 9/1977 | Takekoshi | 528/208 |
| 4,073,773 | 2/1978 | Banucci et al. | 528/208 |
| 4,157,996 | 6/1979 | Boldebuck et al. | 528/185 |
| 4,197,396 | 4/1980 | Banucci et al. | 528/208 |
| 4,221,897 | 9/1980 | Takekoshi | 528/185 |

*Primary Examiner*—Howard E. Schain
*Attorney, Agent, or Firm*—William A. Teoli; James C. Davis, Jr.

[57] ABSTRACT

A method is described for making substantially solvent-free particulated injection moldable polyetherimide oligomer directly from aromatic bis(ether anhydride) and organic diamine. The particulated polyetherimide oligomer can be used to make shaped, high molecular weight polyetherimide by melt polymerization.

13 Claims, No Drawings

INJECTION MOLDABLE POLYETHERIMIDE OLIGOMERS AND METHOD FOR MAKING

CROSS REFERENCES TO RELATED APPLICATIONS

This application is a continuation of copending application Ser. No. 37,438, filed May 9, 1979, now abandoned. Reference is made to copending application Ser. No. 37,437 of Eugene G. Banucci et al, filed May 9, 1979, for Particulated Polyetherimide now abandoned, and Method for Making and my copending application Ser. No. 37,435, filed May 9, 1979 now U.S. Pat. No. 4,221,897, issued Sept. 9, 1980, where all of these applications are assigned to the same assignee as the present invention.

BACKGROUND OF THE INVENTION

As shown by Banucci et al U.S. Pat. No. 4,098,800, assigned to the same assignee as the present invention, particulated oligomeric polyetherimide acids can be made by effecting reaction between (a) an aromatic bis(ether anhydride) or "organic dianhydride" of the formula,

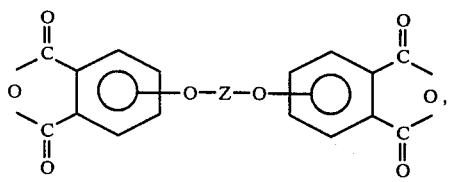

and (b) mixtures of one or more of said bis(ether anhydride)s with up to 30 mole percent benzophenone dianhydride of the formula,

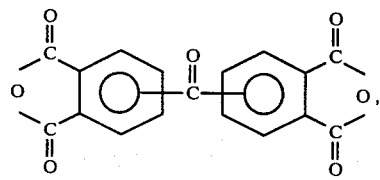

with at least one organic diamine of the general formula, $$H_2N-R-NH_2, \qquad (3)$$

in an inert organic liquid selected from the group consisting of (c) chlorinated hydrocarbon selected from the group consisting of methylene chloride, chloroform, 1,2-dichloroethane, and mixtures thereof and (d) mixtures of said chlorinated hydrocarbon with up to 50% by weight of acetone to form oligomeric polyetheramide-acid which is substantially insoluble in said liquid, where Z is a member selected from

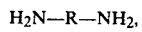
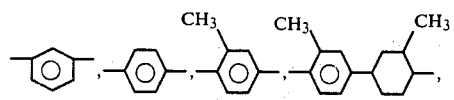

-continued

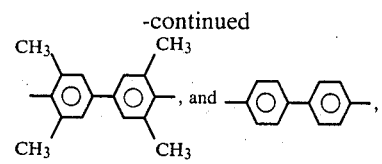

and divalent organic radicals of the general formula,

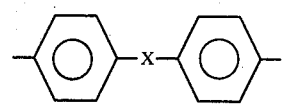

where X is a member selected from the class consisting of divalent radicals of the formulas,

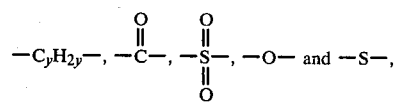

where y is an integer from 1 to 5, and R is a divalent organic radical selected from the class consisting of aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxane and divalent radicals of the formula,

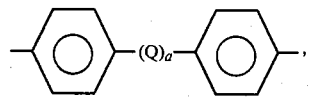

where Q is a member selected from —O—, —S—, and —$C_xH_{2x}$—, x is is an integer from 1 to 5 and a is 0 or 1.

It has been found that the above-described particulated polyetheramide acids of Banucci et al are useful in various coating applications, for example, applications to aluminum or copper wire using fluid bed electrostatic coating procedures. However, these electrostatically applied oligomeric powders often form films containing entrapped bubbles which reduces the utility of the resulting polyetherimide as an insulating coating.

In copending application RD-8287, filed concurrently herewith, improved results were achieved when the particulated, substantially organic solvent-free polyetheramide acid of Banucci et al was heated in a nonoxidizing atmosphere for a time sufficient to effect at least a 70% imidization without substantially sintering the powder. A reduction in bubbling of films was achieved when the imidized powder was applied onto various substrates such as wire. However, the resulting films were often highly cross-linked, or the polyetheramide acid oligomers often had amine terminal groups rendering the prepolymers unsuitable for making high molecular weight thermoplastics by standard injection molding techniques.

The present invention is based on the discovery that particulated substantially organic solvent-free polyetherimide oligomer, capable of being injection molded to the high molecular weight state, can be made by coreacting substantially equal molar amounts of aromatic bis(etheranhydride) of formula (1) and organic diamine of formula (2) under aqueous interfacial polymerization conditions, instead of using a halogenated organic solvent in the absence of water as utilized by Banucci et al. The surprising feature of the present invention, is that the use of water in combination with an appropriate organic solvent under interfacial polymerization conditions has been found to allow for the recovery of a polyetheramide acid product in which the stoichiometry of the initial aromatic bis(ether anhydride) and organic diamine reactants is substantially maintained. As a result, the recovered polyetheramide acid can be readily converted to a high molecular weight injection moldable plastic substantially free of cross-linking.

STATEMENT OF THE INVENTION

There is provided by the present invention, particulated, substantially organic solvent-free polyetherimideamide acid oligomer having an average particle size in the range of from about 5 microns to 80 microns and an intrinsic viscosity of less than 0.3 in dimethylformamide at 25° C., which is convertible under melt polymerization conditions at temperatures in the range of 200° C. to 400° C. to an injection moldable polyetherimide having an intrinsic viscosity of at least 0.2 in chloroform at 25° C. and consisting essentially of chemically combined units of the formula,

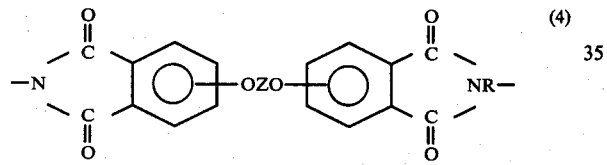

which particulated polyetherimideamide acid is the polyaddition product of reaction at a temperature in the range of 0° C. to 100° C. under interfacial conditions substantially equal molar amounts of an aromatic bis(ether anhydride) of formula (1), and an organic diamine of formula (3), where R and Z are as previously defined.

The polyetherimideamide acid oligomers of the invention can be further defined as polyetherimide prepolymer prepared by the reaction of substantially equal molar amounts of organic dianhydride of formula (1), and organic diamine of formula (3), under interfacial polymerization conditions, where the stoichiometry of the original reactants in the recovered polyetherimide acid reaction product is substantially maintained which reaction product comprises polyetherimideamide acid selected from the class consisting of (A) polyetheramide acid comprising imide amide acid units selected from

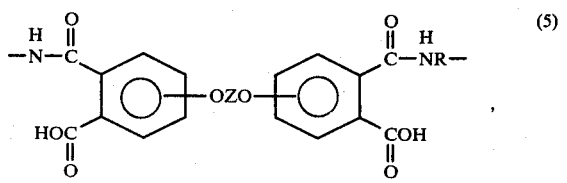

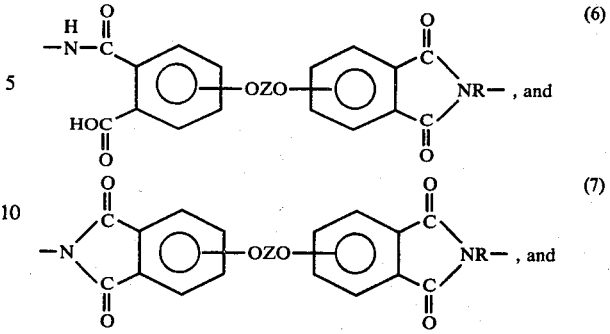

mixtures thereof, having up to 20 mole percent of chemically combined terminal units selected from

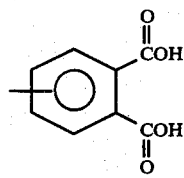

and mixtures of such diacid units and one or more terminal units selected from $-NH_2$,

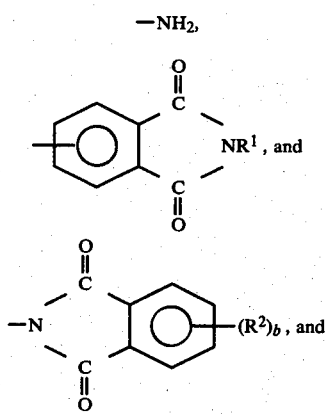

(B) a mixture of (A) and up to 15% by weight of ether tetra-acid of the formula,

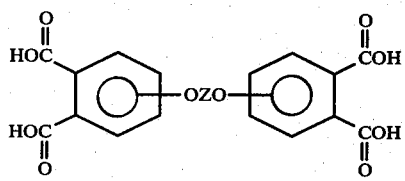

where Z and R are as previously defined, $R^1$ is selected from $C_{(6-13)}$ aromatic radicals and $C_{(1-20)}$ alkyl radicals and $R^2$ is selected from $C_{(1-20)}$ alkyl radicals and $R^1O-$ radicals and b is equal to 0 to 2 inclusive.

In another aspect of the present invention there is provided a method for making polyetheramide acid having chemically combined units included within formulas (5)-(7) which comprises (1) agitating substantially equal molar amounts of aromatic bis(ether anhydride) of formula (1), and organic diamine of formula (2), under aqueous-organic solvent interfacial conditions at a temperature in the range of 0° C. to 100° C., (2) effecting the removal of the organic solvent from the resulting mixture, and (3) recovering the resulting polyetheramide acid from the mixture of (2).

Among the aromatic bis(ether anhydride)s of formula (1) there are included 2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
4,4'-bis(3,4-dicarboxyphenoxy)benzophenone dianhydride;
4,4'-bis(3,4-dicarboxyphenoxy)diphenyl sulfone dianhydride;
4,4'-bis(3,4-dicarboxyphenoxy)diphenyl sulfide dianhydride;
2,2-bis[4-(2,3-dicarboxyphenoxy)phenyl]propane dianhydride;
4,4'-bis(2,3-dicarboxyphenoxy)phenyl propane dianhydride;
4,4'-bis(2,3-dicarboxyphenoxy)diphenyl sulfide dianhydride;
4,4'-bis(2,3-dicarboxyphenoxy)benzophenone dianhydride;
4,4'-bis(2,3-dicarboxyphenoxy)diphenyl sulfone dianhydride;
4-(2,3-dicarboxyphenoxy)-4'-(3,4-dicarboxyphenoxy)diphenyl-2,2-propane dianhydride, and mixtures thereof.

Aromatic bis(ether anhydride)s especially preferred herein are 2,2-bis[4-(3,4-dicarboxyphenoxy)phenyl]propane dianhydride, 2,2-bis[4-(2,3-dicarboxyphenoxy)phenyl]propane dianhydride; 4-(2,3-dicarboxyphenoxy)-4'-(3,4-dicarboxyphenoxy)diphenyl-2,2-propane dianhydride; and mixtures thereof.

Some of the aromatic bis(ether anhydride)s of formula (1) are shown in U.S. Pat. No. 3,972,902 (Darrell Heath and Joseph Wirth). As described therein, the bis(ether anhydride)s can be prepared from the hydrolysis, followed by dehydration of the reaction product of a nitro-substituted phenyl dinitrile with a metal salt of a dihydric phenol compound in the presence of a dipolar aprotic solvent.

Additional aromatic bis(ether anhydride)s also included by formula (1) are shown by Koton, M. M. Florinski, F. S. Bessonov, M. I. Rudakov, A. P. (Institute of Heteroorganic Compounds, Academy of Sciences, (U.S.S.R.), U.S.S.R. 257,010, Nov. 11, 1969, Appl. May 3, 1967, and by M. M. Koton, F. S. Florinski, Zh. Org. Khin, 4 (5), 774 (1968).

There are included within formula (3), organic diamines such as o-phenylenediamine;
m-phenylenediamine;
p-phenylenediamine;
4,4'-diaminodiphenylpropane;
4,4'-diaminodiphenylmethane (commonly named 4,4'-methylenedianiline);
4,4'-diaminodiphenyl sulfide (commonly named 4,4'-thiodianiline);
4,4'-diaminodiphenyl ether (commonly named 4,4'-oxydianiline);
1,5-diaminonaphthalene;
3,3'-dimethylbenzidene;
3,3'-dimethoxybenzidine;
2,4-bis(β-amino-t-butyl)toluene;
bis(p-β-amino-t-butyl)ether;
bis(p-β-methyl-o-aminopentyl)benzene;
1,3-diamin-4-isopropylbenzene;
1,2-bis(3-aminopropoxy)ethane;
benzidine;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis(3-aminopropyl)tetramethyldisiloxane;
bis(4-aminobutyl)tetramethyldisiloxane;

and mixtures of such diamines.

Organic diamines preferred herein are 4,4'-methylenedianiline, 4,4'-oxydianiline, metaphenylenediamine, paraphenylenediamine, and mixtures thereof.

In the practice of the invention, the mixture of aromatic bis(ether anhydride), or "organic dianhydride" and organic diamine are contacted under conditions of high agitation in the presence of water and an organic solvent to produce oligomeric polyetheramide acid, or oligomer. The mixture is then stripped of organic solvent followed by recovery of the resulting organic prepolymer from the aqueous mixture.

Suitable organic solvents which can be used are, for example, chlorinated hydrocarbons, such as methylene chloride, chloroform, dichloroethylene, aromatic hydrocarbons such as benzene, toluene, xylenes, ethylbenzene, cumene, ether solvents, such as diethylether, isobutylether, etc. Substantially equal molar amounts of organic dianhydride and organic diamine are used to produce the oligomer. In addition, chain stoppers can be utilized to provide high molecular weight injection moldable polyetherimide during the initial formation of the oligomer or during subsequent melt polymerization of the oligomer. Suitable chain stoppers are, for example, phthalic anhydride, phenoxyphthalic anhydride, naphthalic anhydride, or organic amines such as octadecylamine, cyclohexylamine, aniline, p-ethylaniline, etc. The chain stoppers can be used at from 0.01 to 0.5 mole of chain stopper per mole of organic dianhydride.

It is preferred to add the organic diamine as an aqueous solution to an organic solvent solution of the organic dianhydride, while it is being agitated, such as being stirred, shaken, etc. However, effective results can be achieved if both solutions are contacted simultaneously, for example, in a common mixing vessel along with means for agitation.

Reaction between the organic dianhydride and the organic diamine can be effected under interfacial conditions at a temperature in the range of 0° C. to 100° C., and preferably 15° C. to 50° C. Depending upon such factors as the temperature, degree of agitation, nature of reactants, etc., time for the formation of the polyetheramide acid can vary from 5 to 10 minutes or less to 1 to 2 hours or more.

Experience has shown that recovery of the polyetheramide acid reaction product which can consist essentially of chemically combined units of the formula,

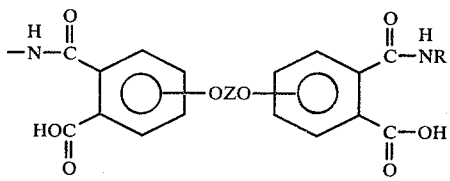

can be achieved by initially effecting the evaporation of the organic solvent from the reaction mixture which can be achieved at temperatures of 30° C. to 100° C. depending upon such factors as the volatility of the organic solvent, the pressure, etc.

After the organic solvent has been evaporated, or removed as an azeotropic mixture with water, recovery of the resulting organic prepolymer can be achieved by effecting its separation from the aqueous residue.

The oligomers of the present invention can be further characterized as having an average particle size in the range of from 5 microns to 80 microns. More particularly, the oligomeric prepolymers can be blended with various inert fillers such as various particulated fillers, for example, glass fibers, silica fillers, carbon whiskers, which can be utilized at up to 50% by weight of the resulting total blend. The particulated oligomer either alone or reinforced as previously indicated can then be converted to shaped parts by standard injection molding techniques.

In order that those skilled in the art will be better able to practice the invention, the following examples are given by way of illustration and not by way of limitation. All parts are by weight.

EXAMPLE 1

There was added dropwise, 500 parts of an aqueous solution of 19.189 parts of metaphenylenediamine to a mixture of 92.35 parts of 2,2-bis[4-(3,4-dicarboxyphenoxy)phenyl]propane dianhydride (4-BPADA) and about 469 parts of methylene chloride while the mixture was stirred under nitrogen at room temperature for a period of about 60 minutes. A thick, white slurry was obtained. The slurry was stirred for an additional four hours at room temperature and then heated to distill the methylene chloride. After the methylene chloride was removed, the reaction mixture was allowed to cool and it was filtered. A white precipitate was obtained which was washed with about 500 parts of water and then dried. There was obtained a yield of 110.13 parts of product and it had an intrinsic viscosity in N,N-dimethylformamide of about 0.16 dl/g. Based on method of preparation, the product was a polyamide acid resulting from the reaction of the aforementioned aromatic bis(ether anhydride) and organic diamine at substantially precise stoichiometric ratios based on the fact that the titration of the combined filtrate and wash indicated that less than 0.02% of the monomer was present. The product has about 80 mole percent of amide acid units, 7 mole percent of imide units, 13 mole percent of diacid units and a molecular weight of about 2500.

The same ingredients were reacted, except that the reaction was performed in methylene chloride in the absence of water. A polyamide acid was isolated by filtration. It was found that about 31.1% of unreacted 4-BPADA remained in the filtrate. This indicated that the resulting polyamide acid had terminal amine functionality.

A mixture of 90.440 parts of the above polyamide acid made in accordance with the interfacial polymerization, 2.316 parts of 4-PBADA and 2.120 parts of p-phthalimidoaniline as a chain capping agent was placed in a Vertical Helicone Mixer. The mixture was stirred under argon and heated at 270° C. for 2 hours. There was obtained an amber colored viscous melt which was extruded out of the reactor. The intrinsic viscosity of the extrudate was 0.51 dl/g in chloroform. Based on method of preparation, the extruded product was a polyetherimide consisting essentially of chemically combined units of the formula,

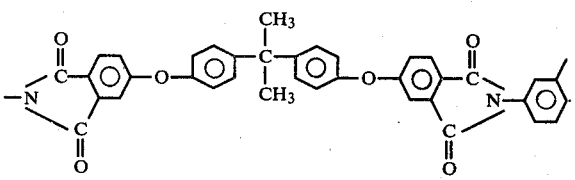

Those skilled in the art would know that the resulting polyetherimide is a valuable injection moldable plastic convertible to a variety of useful shapes. In addition, it can be reinforced with a variety of fillers.

EXAMPLE 2

There was added an aqueous solution of about 480 parts of water and 20 parts of metaphenylenediamine dropwise over a period of 115 minutes to a mixture with stirring of 89.970 parts of 4-BPADA, 1.045 part of phthalic anhydride and about 469 parts of methylene chloride. The resulting mixture was stirred at room temperature under nitrogen. After the addition was completed, the resulting mixture was further stirred for 4 hours at room temperature and then heated to strip the mixture of methylene chloride. There was obtained a white aqueous slurry which was filtered. The precipitate was washed with water and dried. There was obtained a 98.2% yield of product or 108.5 grams. The product was also finely divided and had an average particle size in the range of from 10 to 20 microns. The particle size distribution was measured by a Coulter counter which indicated that the median diameter of the particles was 20 microns at 90% weight fraction consisted of particles larger than 8 microns. Based on infrared analysis and titration for both amide acid functionality and imide functionality in accordance with the procedure of Boldebuck U.S. Pat. No. 3,737,478, the product was a particulated polyamide acid having about 80.3 mol percent of polyamideacid units and about 8.9 mol percent of polyimide units. In addition, the polyamide acid contained about 10.8 mole percent of diacid units, based on the total moles of amide acid, imide and diacid units in the polyamide acid.

The above polyamide acid was charged into a Vertical Helicone Mixer and heated with stirring at 275° C. under an argon atmosphere. The polyamide acid was heated for 2 hours and then was taken out of the reactor and cooled. There was obtained a polyetherimide consisting essentially of chemically combined units of the formula in Example 1 having a number average molecular weight of 36,600, a weight average of 105,600 and an intrinsic viscosity of 0.75 dl/g in chloroform. The polyetherimide was a valuable injection moldable thermoplastic.

EXAMPLE 3

There was added dropwise, a solution of 15.555 parts of metaphenylenediamine in about 413 parts of deaerated water to a stirred mixture of 385 parts of methylene chloride containing 73.37 parts of 4-BPADA and 1.382 part of 4-phenoxyphthalic anhydride at 20° C. under nitrogen. Product precipitated within 13 minutes after the start of the addition, which was completed in about 100 minutes. The resulting slurry was stirred at room temperature for 4 hours and then heated to 55° C. allowing the methylene chloride to distill off. The resulting aqueous suspension was then filtered to isolate the product which was washed with 200 parts of water and dried. There was obtained a 98.7% yield of product and titration of the filtrate showed that less than 0.005% of the reactants were lost in the filtrate. The infrared spectrum of the product indicated that it was a low molecular weight polyamide acid.

The above oligomer amounting to 84.124 parts was placed in a Vertical Helicone Mixer and heated at 270°–280° C. under an argon atmosphere for 1.75 hours. There was obtained a polyetherimide having an intrinsic viscosity of 0.66 dl/g in chloroform. The polyetherimide was useful for making high performance thermoplastic parts by standard injection moldable procedures.

EXAMPLE 4

There was added 2.786 parts of octadecylamine to a stirred mixture of 89.652 parts of 4-BPADA in about 467 parts of methylene chloride at room temperature. There was then added to the resulting mixture at room temperature while it was stirred 18.069 parts of metaphenylenediamine in 500 parts of deaerated water over a period of about 15 minutes. There was obtained a thick white slurry. The slurry was further stirred at room temperature for 4½ hours and then heated to 50°–55° C. The methylene chloride was distilled off over a period of about 1 hours. There was obtained a 95.6% yield of product which was filtered and washed with 200 parts of water and dried. Based on method of preparation, the product was a polyamide acid having about 82.4 mole percent of polyamide acid units, 5.4 mole percent of polyimide units and 12.2 mole percent of diacid units and chain stopped with octadecylamine.

There was placed 100.24 parts of the above polyamide acid in a Vertical Helicone Mixer. The polyamide acid was heated and stirred at 270° C. for 2 hours under an argon atmosphere. There was obtained molten polyetherimide which drained out and cooled. A yield of 80.69 parts was obtained having an intrinsic viscosity of 0.54 dl/g in chloroform. The glass transition temperature of the polyetherimide was 202° C. as determined by differential scanning calorimetry.

EXAMPLE 5

There was added 2.785 parts of octadecylamine over a period of 20 minutes to a stirred mixture of 89.623 parts of 4-BPADA in about 467 parts of methylene chloride under nitrogen at room temperature. There was then added to the resulting mixture an aqueous solution of 18.063 parts of metaphenylene diamine in about 500 parts of water which was added dropwise. The addition of the diamine was complete in 55 minutes, during which time a white slurry was formed. The slurry was then further stirred at room temperature for 4 hours and then heated to distill off the methylene chloride. The resulting mixture was then further heated at reflux for 4 hours at 102° C. and then filtered. The precipitate was washed with about 100 parts of water and dried. There was obtained 102.9 parts of product which, based on its method of preparation and its infrared spectrum was a polyetheramide acid having 63 mole percent of its polyamide acid units imidized. The average particle size of the polyetheramide acid was 20 microns and 90 weight percent of the product consisted of particles larger than 10 microns.

There was placed 102.69 parts of the above oligomer in a Vertical Helicone Mixer and heated with stirring under an argon atmosphere at 273° C. for 2 hours. There was obtained a viscous melt which was drawn out as strands and cooled. The amber colored tough product had an intrinsic viscosity of 0.51 dl/g in chloroform. Based on method of preparation and gel permeation chromatography, the product was a polyetherimide having an average molecular weight of 31,600 and a weight average of 66,000. It was useful as an injection moldable plastic to make a variety of tough useful shaped products.

EXAMPLE 6

There was added 1.112 parts of dodecylamine over a period of five minutes to a stirred mixture of 51.046 parts of 4,4'-bis(3,4-dicarboxyphenoxy)diphenyl sulfide dianhydride, 250 parts of water and 300 parts of chloroform. There was then added 19.423 parts of finely pulverized 4,4'-oxydianiline over a period of 15 minutes. The resulting slurry of a prepolymer was stirred at room temperature for an additional 15 minutes and heated to reflux for 45 minutes. The chloroform was then allowed to distill off over a period of 40 minutes and cooled to room temperature. The prepolymer was filtered and dried. There was obtained 71.2 parts of product which, based on its method of preparation and its infrared spectrum was a polyetheramide acid.

There was placed 70 parts of the above oligomer in a Vertical Helicone Mixer and heated with stirring under an argon atmosphere at 280° C. for 2 hours. There was obtained an amber colored polyimide which had an intrinsic viscosity of 0.70 in m-cresol and glass transition temperature of 209° C.

EXAMPLE 7

Into 300 parts of vigorously stirred water were added simultaneously over a period of 0.5 hour a solution comprising 52.047 parts of 4-BPADA and 350 parts of methylene chloride and a solution comprising 19.231 parts of 4,4'-methylenedianiline, 0.559 part of aniline and 200 parts of methylene chloride. The resulting white slurry was stirred and heated to distill off the methylene chloride. The aqueous suspension of the white solid particle was cooled and filtered. The yield of the product was 71.1 parts. Based on method of preparation, the product was a polyamide acid having about 81 mole percent of amide acid units, 6 mole percent of imide units and 13 mole percent of diacid units.

Although the above examples are directed to only a few of the very many variables of the present invention, it should be understood that the present invention is directed to a much broader class of oligomeric polyetherimideamide acid and method for making such materials.

What I claim as new and desire to secure by Letters Patent of the United States is:

1. Particulated substantially organic solvent-free polyetherimide amide acid prepolymer convertible under melt polymerization conditions to high molecular weight injection moldable polyetherimide which comprises the product of reaction under interfacial polymerization conditions of substantially equal molar amounts of aromatic bis(ether anhydride) and organic diamine which allows for the production of reaction product having terminal units of the formula,

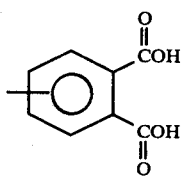

which can be present at up to about 20 mole percent, based on the total moles of chemically combined units in the polyetherimide amide acid prepolymer and where the stoichiometry of the initial reactants in the reaction product is substantially maintained.

2. Particulated substantially organic solvent-free polyetherimideamide acid which is the product of reaction under aqueous-organic interfacial conditions of substantially equal molar amounts of aromatic bis(ether anhydride) and organic diamine which is selected from the class consisting of (A) polyetherimideamide acid consisting essentially of one or more chemically combined units selected from

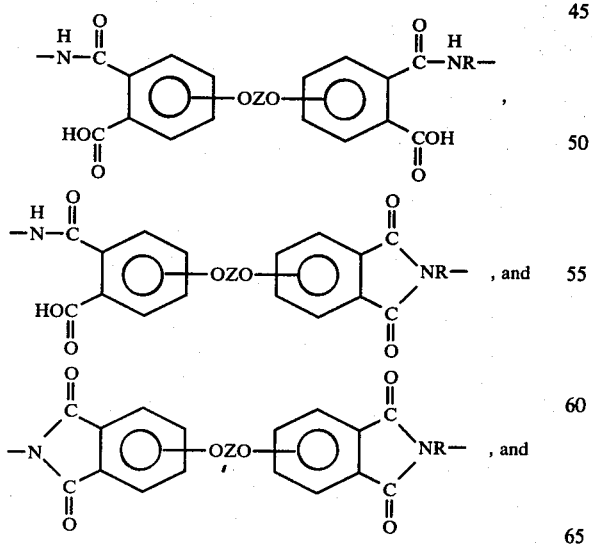

mixtures thereof, having chemically combined terminal units of the formula,

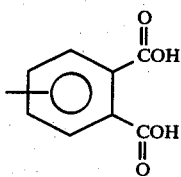

and mixtures of such diacid units and one or more terminal units selected from

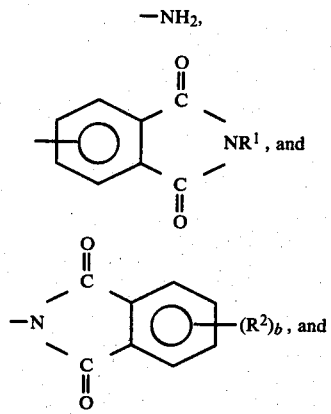

(B) a mixture of (A) and up to 15% by weight of ether tetra-acid of the formula,

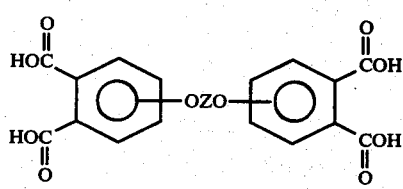

where Z is a member selected from

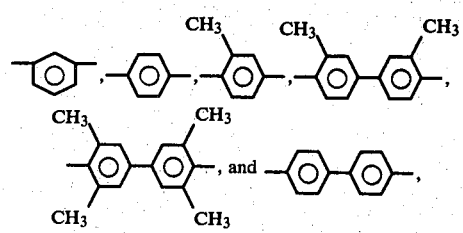

and divalent organic radicals of the general formula,

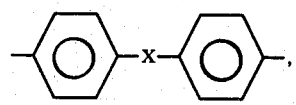

X is a member selected from the class consisting of divalent radicals of the formula,

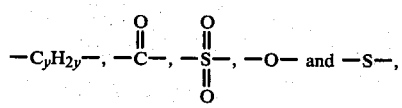

R is a divalent organic radical selected from the class consisting of aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxane and divalent radicals of the formula,

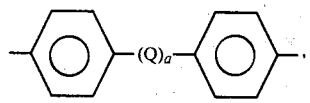

$R^1$ is selected from $C_{(6-13)}$ aromatic radicals and $C_{(1-20)}$ alkyl radicals, $R^2$ is selected from $C_{(1-20)}$ alkyl radicals and $R^1O$-radicals, Q is a member selected from the class consisting of —O—, —S—, and —$C_xH_{2x}$—, y is an integer from 1 to 5, x is an integer from 1 to 5, a is 0 or 1, and b is equal to 0 to 2 inclusive.

3. A polyetheramide acid in accordance with claim 1, where the aromatic bis(ether anhydride) is 2,2-bis[4-(3,4-dicarboxyphenoxy)phenyl]propane dianhydride and the organic diamine is metaphenylenediamine.

4. Polyetheramide acid in accordance with claim 2, where Z is

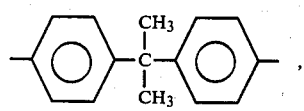

R is

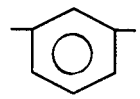

and $R^1$ is -$C_{18}H_{37}$.

5. A method for making polyetheramide acid which comprises
   (1) agitating substantially equal molar amounts of aromatic bis(ether anhydride) of the formula,

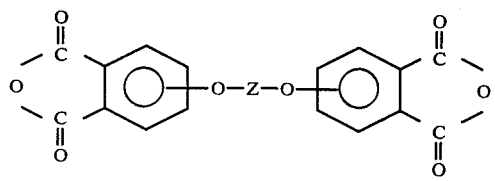

and organic diamine of the formula,

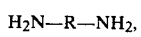

$H_2N$—R—$NH_2$, under aqueous-organic solvent interfacial conditions at a temperature in the range of 0° C. to 100° C.,
   (2) effecting the removal of the organic solvent from the resulting mixture, and
   (3) recovering the resulting polyetheramide acid from the mixture of (2), having the stoichiometry of the aromatic bis(ether anhydride) and the organic diamine substantially maintained,
where Z is a member selected from

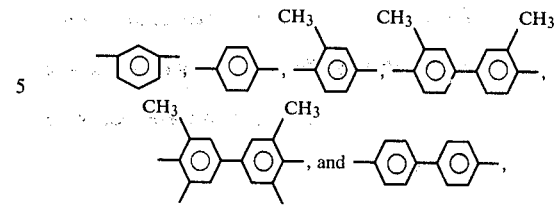

and divalent organic radicals of the general formula,

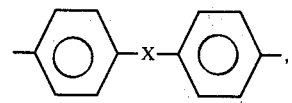

X is a member selected from the class consisting of divalent radicals of the formulas,

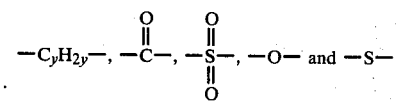

R is a divalent organic radical selected from the class consisting of aromatic hydrocarbon radicals having from 6 to 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxane and divalent radicals of the general formula,

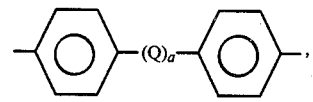

Q is a member selected from the class consisting of —O—, —S—, and —$C_xH_{2x}$—, y is an integer from 1 to 5, x is an integer from 1 to 5, and a is 0 or 1.

6. The method of claim 5, where the organic solvent is methylene chloride.

7. The method of claim 5, where the organic dianhydride is 2,2-bis[4-(3,4-dicarboxyphenoxy)phenyl]propane dianhydride.

8. The method of claim 5, where the organic amine is metaphenylene diamine.

9. A method of making polyetherimide capable of being injection molded consisting essentially of chemically combined units of the formula,

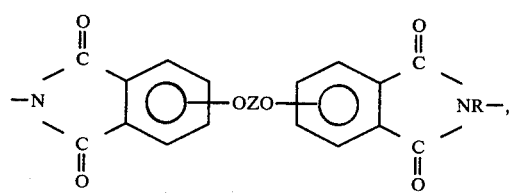

which comprises, melt polymerizing at a temperature of 200° C. to 400° C. organic solvent free polyetheramide acid oligomer having an average particle size in the range of from about 5 microns to 80 microns and an intrinsic viscosity of less than 0.3 in dimethylformamide at 25° C., which is the product of reaction under interfacial conditions of substantially equal molar amounts of aromatic bis(ether anhydride) and organic diamine, where Z is a member selected from

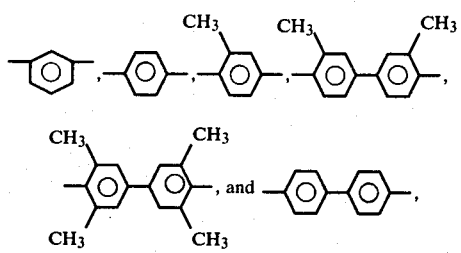

and divalent organic radicals of the general formula,

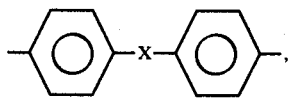

X is a member selected from the class consisting of divalent radicals of the formulas,

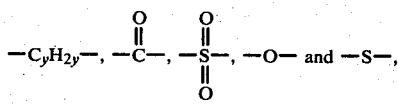

R is a divalent organic radical selected from the class consisting of aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxane and divalent radicals of the general formula,

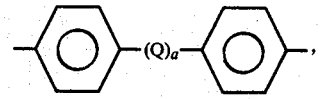

Q is a member selected from the class consisting of —O—, —S—, and —$C_xH_{2x}$—, y is an integer from 1 to 5, x is an integer from 1 to 5 and a is 0 or 1.

10. A method in accordance with claim 9, where the polyetheramide acid is the product of reaction of 2,2-bis[4-(3,4-dicarboxyphenoxy)phenyl]propane dianhydride and metaphenylenediamine.

11. A method in accordance with claim 9 using an organic amine or organic dianhydride chain stopper.

12. A method in accordance with claim 9 using phenoxyphthalic anhydride as a chain stopper.

13. A method in accordance with claim 9 using aniline as a chain stopper.

* * * * *